Figure 1:
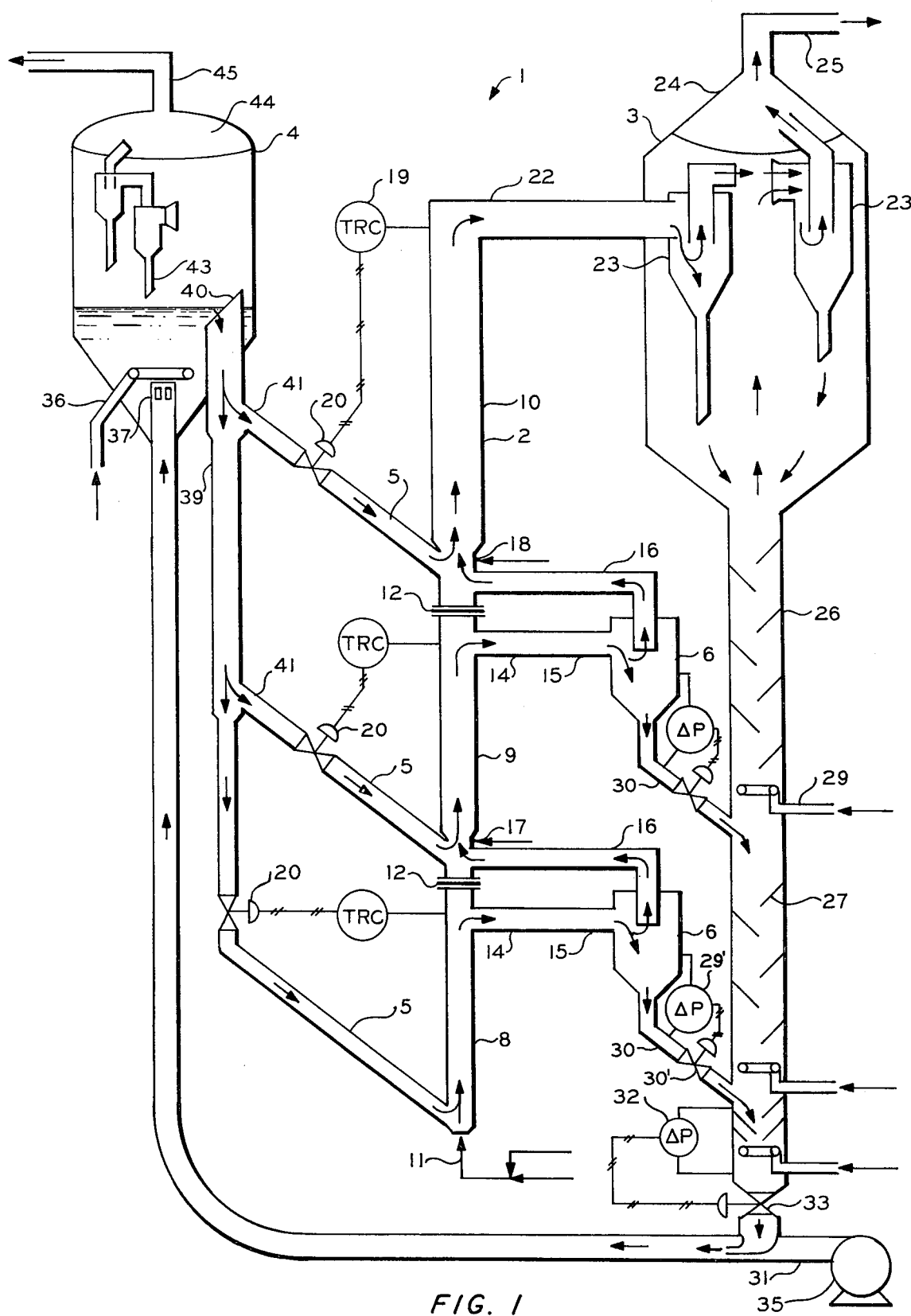

United States Patent [19]

James

[11] 4,026,789

[45] May 31, 1977

[54] METHOD FOR CATALYTICALLY CRACKING HYDROCARBONS

[75] Inventor: John Preston James, Old Ocean, Tex.

[73] Assignee: Phillips Petroleum Company, Bartlesville, Okla.

[22] Filed: Feb. 13, 1976

[21] Appl. No.: 657,818

Related U.S. Application Data

[62] Division of Ser. No. 542,007, Jan. 17, 1975, Pat. No. 3,964,876.

[52] U.S. Cl. .............................. 208/74; 208/164; 208/DIG. 1
[51] Int. Cl.² .................. C10G 13/18; C10G 37/02
[58] Field of Search .......... 23/288 S, 288 B, 288 E; 208/74, 75, 155, 156, DIG.1, 164

[56] References Cited

UNITED STATES PATENTS

| | | | |
|---|---|---|---|
| 2,766,185 | 10/1956 | Pansing | 208/155 |
| 3,175,968 | 3/1965 | Berger | 208/164 |
| 3,186,805 | 6/1965 | Gomory | 208/74 |
| 3,347,778 | 10/1967 | Dill et al. | 208/74 |

*Primary Examiner*—Herbert Levine

[57] ABSTRACT

An apparatus for catalytically cracking hydrocarbons comprising a riser reactor having a plurality of catalyst injectors positioned along the length thereof. Adjacent to and upstream of certain of the catalyst injectors, cyclone separators are connected to the reactor so that fluid which contains a partially converted or cracked hydrocarbon and catalyst pass therethrough for separating the catalyst from the fluid with the fluid being returned to the reactor. Fresh catalyst is introduced into the fluid after same exits the separator to continue the cracking process. Steam can also be introduced into the reactor adjacent the catalyst injectors.

7 Claims, 1 Drawing Figure

METHOD FOR CATALYTICALLY CRACKING HYDROCARBONS

This is a division of application Ser. No. 542,007, filed Jan. 17, 1975, now U.S. Pat. No. 3,964,876.

In recent years the process of catalytic cracking of gas oils and heavier petroleum stocks to produce gasoline and light olefins has been significantly improved by the development of improved cracking catalysts. These catalysts are generally alumino silicates, frequently referred to as zeolite or molecular sieve type catalysts and are characterized by high activity and excellent selectivity for producing desirable motor fuel components. To take advantage of the characteristics of the new catalyst, the conventional fluid bed reactor has been replaced by a riser or transfer line reactor.

A disadvantage in the use of riser reactors for catalytic cracking is that as commonly practiced, most of the coke which is formed is produced upon initial vaporization of the hot oil as same is mixed with steam and catalyst. Because of this fact, the balance of the reaction through the reactor is carried out with coke-laden catalyst which is less active and less selective than clean catalyst. Also, the initial reaction is endothermic whereby the balance of the cracking is carried out at lower temperatures, an undesirable condition for active zeolite type catalysts which tend to have better selectivities at higher temperatures.

The use of riser type or transfer line reactors is desirable as same have advantages which are well known and include: rapid mixing of oil, steam and catalyst, short reactor residence time, cocurrent flow of catalyst and oil with virtual elimination of backmixing, rapid return of catalyst to the regenerator so that low coke levels can be maintained on the catalyst, and good control of operating variables such as reactor temperature, catalyst/oil ratio and the like.

The principal objects and advantages of the present invention are: to provide an apparatus and method for catalytically cracking hydrocarbons which overcomes the above-mentioned difficulties; to provide such an apparatus which in operation will result in improved cracking of hydrocarbons and have improved operating efficiencies; to provide such an apparatus which is adapted to reduce or eliminate catalyst which becomes coked at the beginning of a catalytic cracking process; to provide such an apparatus which is operable in zones so that the catalytic cracking process can be optimized; to provide such an apparatus which has improved temperature control with the temperature being adjustable in different zones; to provide such an apparatus which provides greater flexibility in the catalytic cracking process; to provide such an apparatus and process which is well adapted for its intended use.

Other objects and advantages of the present invention will become apparent from the following detailed description taken in connection with the accompanying drawings wherein are set forth by way of illustration and example certain embodiments of this invention.

FIG. 1 is a diagrammatic view of a catalytic cracking apparatus.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

Referring more in detail to the drawings:

The reference numeral 1 designates generally a catalytic cracking apparatus comprised of a reactor 2 in which cracking of a hydrocarbon material such as gas oil is accomplished. The terms "hydrocarbon material" and "oil" are used interchangeably herebelow and have the same meaning. The reactor 2 is connected to means such as a disengaging drum 3 for the separation of catalyst, hydrocarbon materials and steam where the catalyst is collected preferably for return to a regenerator 4 for further processing. Catalyst injectors 5 are connected to the reactor 2 at two or more positions along the length thereof and operable for injection of catalyst into the reactor 2. Separator means 6 communicate with the reactor 2 for the hydrocarbon material, steam and catalyst in the reactor 2 to pass through to separate the catalyst from the hydrocarbon material which is preferably in the form of a vapor. The separated catalyst is collected for a purpose to be later described.

In the illustrated structure the reactor 2 is preferably of a riser or transfer line type reactor with same being elongate in the vertical direction. As shown, the reactor 2 is comprised of two or more zones and as shown comprises three zones 8, 9 and 10, respectively. It is to be understood, however, that any number of zones, preferably two or more, can be provided. The downstream zone or lower disposed zone 8 has suitable means as at 11 through which steam and a hydrocarbon material such as gas oil can be introduced into the reactor 2 in a conventional or suitable manner. A catalyst injector 5 is connected to the reactor 2 adjacent the means 11 and is operable for the injection of catalyst into the reactor 2. The catalyst, steam and hydrocarbon material move upwardly through the reactor 2 with the catalyst/oil ratio, temperature and residence time preferably being selected to achieve complete or substantially complete oil vaporization while maintaining low oil conversion, preferably below about 40 percent on the initial reaction zone 8. Typical operating parameters would include catalyst to oil weight ratio at about 5 or less, reactor temperature below about 970° F and residence time in the primary zone in the order of about 0.5 seconds. It is to be noted that the operating parameters will be dependent on various factors and those listed are for a typical cracking process for gas oil.

Zones 8, 9 and 10 are suitably separated such as by flow restricters 12 which can totally or partially prevent flow of fluid which would include steam and hydrocarbon material with catalyst from flowing directly from one end of the reactor to the other end. As shown, the flow restricters 12 completely block flow from one zone to the next. It is to be understood that although the zones 8, 9 and 10 are shown in superposed relation that the zones can be connected in series by suitable conduits so as to reduce the total vertical height of the reactor. Bypasses 14 are provided to connect the adjacent zones wherein the bypasses are comprised of an inlet conduit 15 and outlet conduit 16 which also connect the separator means 6 between the adjacent zones. Any suitable type of separator means can be used which are operable to separate catalyst from the fluid and, as shown, the separator means 6 are cyclone separators. It is desirable that a downstream reaction zone be of a larger cross-sectional area than its immediate upstream zone to accommodate the increased vapor volume that it will carry. As shown with three zones in the reactor 2, two restrictions are provided as are two separator means 6 which are each connected to the reactor 2. A catalyst injector 5 is connected to the reactor 2 so as to inject fresh catalyst into the respective zone at a position preferably adjacent to the point where the outlet conduit 16 discharges into the respective zone. Steam may also be injected as at 17 and 18 adjacent to the point of the respective catalyst injector for such things as changing partial pressure of oil vapor, changing residence time by control of velocity, and as an aid in catalyst and oil vapor mixing. Fresh catalyst is injected into the respective zone as required, with the rate of catalyst feed being controlled in any suitable manner such as by a temperature controller 19 which senses the temperature in the respective zone and controls a valve 20 in response to the temperature sensed to control the feed rate of catalyst.

The mixture of hydrocarbon material, steam and catalyst is exhausted from the reactor 2 after passing through the final reaction zone into means which are operable to separate the catalyst from the fluid. Any suitable manner of separation can be provided and as shown and as is conventional in catalytic cracking processes, a disengaging drum is connected to the exhaust 22 of the reactor 2 with the disengaging drum having one or more separators such as cyclone separators 23 with same being preferably two or more in number and operated in series. The fluid passes through the cyclones 23 for separation of the catalyst with the catalyst being discharged from the cyclones into the interior of the disengaging drum for collection therein. The hydrocarbon material and steam portion of the fluid is discharged from the final cyclone 23 into a plenum 24 and out an exhaust 25 wherein same is conducted to other processing equipment, as is conventional in hydrocarbon refining. The catalyst discharged into the disengaging drum 3, passes downwardly through a catalyst standpipe 26 which preferably has a plurality of baffles 27 therein. During the separation of the catalyst from the fluid by the cyclones 23, a certain amount of hydrocarbon material is discharged into the disengaging drum 3 in which event steam can be introduced into the standpipe 26 to strip the hydrocarbon materials wherein the steam and the stripped hydrocarbons pass into the cyclones 23 for discharge into the plenum 24. As shown, steam is introduced into the standpipe by a plurality of steam injecting means 29 which are positioned along the length of the standpipe 26.

In the form of the invention shown the catalyst separated by the separator means 6 is discharged therefrom into the standpipe 26 by a conduit 30 which connects each of the separator means to the standpipe 26. A valve 30' can be provided in the conduit 30 and operably connected to a pressure controller 29' to maintain a positive head or seal for the separator means 6 and control the rate of catalyst discharge therefrom. The catalyst collected in the standpipe 26 is discharged therefrom preferably at a position adjacent the lower end thereof into a conduit 31. It is desirable to control the discharge rate of the catalyst from the standpipe 26 and one convenient means of accomplishing this is by having a pressure controller 32 operably connected to the standpipe 26 and to a valve 33 which allows the catalyst to be discharged from the standpipe in response to a predetermined pressure differential as measured by the pressure controller 32.

In a preferred embodiment of the present invention, the spent catalyst that is collected in the standpipe 26 is conveyed through the conduit 31 to a regenerator 4 for regeneration of the catalyst and possibly its reuse. Although any suitable means of conveying the catalyst from the standpipe 26 to the regenerator can be used, in the form shown an air blower 35 is connected to the conduit 31 and provides air to blow through conduit 31 and convey catalyst therewith to the regenerator 4. The regenerator 4 can be of any suitable structure as is well known in the art and as shown the catalyst enters the regenerator at a position adjacent the lower end thereof. An air ring 36 cooperates with an end 37 of conduit 31 for discharge of additional air into the catalyst. Catalyst is maintained at a predetermined level in the regenerator 4 wherein coke which is collected on the catalyst is removed by burning or oxidation. This burning away of the coke regenerates the catalyst and same can be reused if desired in the cracking process. As shown, a regenerator catalyst standpipe 39 extends into the regenerator 4 and has an open end 40 positioned so that at a predetermined level catalyst that has been regenerated can flow through the open end 40 and downwardly through the standpipe 39. Conduits 41 connect the standpipe 39 to the valves 20 and hence the catalyst injectors 5. Air supplied to the regenerator 4 passes through separator means 43, such as cyclone separators to remove catalyst that could be carried away with air. Air is then discharged from the separators 43 into a plenum 44 and out an exhaust 45. It is to be noted that fresh catalysts can also be introduced into the standpipe 39 or regenerator 4 for use in the cracking process.

As described above, steam and a hydrocarbon material such as gas oil is introduced into the lower end of the reactor 2 and catalyst is injected thereinto. The mixture of catalyst and fluid flows upwardly through the first zone 8. Preferably, operation of the first zone is characterized by: low catalyst/oil ratio, relatively low reactor temperature and short residence time so as to achieve complete oil vaporization while maintaining low oil conversion preferably below about 40 percent. As described above, it is usually advantageous to maintain catalyst/oil weight ratio at about 5 or less, reactor temperature below about 970° F and residence time at about 0.5 seconds. Steam, preferably superheated steam, is utilized in a conventional manner to aid in dispersal of the hydrocarbon material and to keep the partial pressure of the hydrocarbon vapors low, preferably below about 20 pounds per square inch. Operating the first zone at conditions to effect low conversion, most of the coke formation can be confined to this zone. Also, if the hydrocarbon material contains heavy metals such as vanadium and nickel, these will be largely deposited on the heavily coked catalyst making it possible to remove them more readily during subsequent catalyst regeneration.

After passing through the first zone, the fluid and catalyst pass through the first separator means 6 where most of the catalyst is separated from the fluid and is discharged through the conduit 30 back to the standpipe 26. It is to be noted that all the catalyst need not be separated from the fluid and that the larger catalyst particles will be more easily separated and generally are more laden with coke and metal. The fluid is then reinjected into the second zone and fresh catalyst and steam are also injected thereinto for further cracking of the fluid. The fluid, steam and catalyst pass through the second zone and into a second separator means where the bulk of the catalyst is again removed from the fluid and discharged into standpipe 26. The fluid from the second zone is then reinjected into the third zone along with fresh catalyst and steam wherein the mixture passes through the third zone for further cracking with the mixture being discharged into the disengaging drum 3 for separation of the catalyst from the fluid. The addition of hot, clean or regenerated catalyst raises the temperature in the second and subsequent zones to a level that promotes highly selective cracking reactions with the temperature being preferably above 1,050° F. Residence time in these zones is approximately 1 to 4 seconds. It is to be noted that all of the catalyst separated can be stripped in a single stripper, i.e., the standpipe 26, and all catalyst regeneration can be accomplished in a single regenerator and redistribution of regenerated catalyst can be done with a single regenerator catalyst standpipe.

It can be seen that the bulk of the reaction is carried out with clean or regenerated catalyst under conditions that create very little coke since the feed to the second and subsequent zones is completely vaporized and most coke-forming reactions occurred in the first zone. Since the subsequent zones after the first zone are operating with clean catalyst, it is feasible to operate at higher oil conversions than would normally be economic. Also, it is within the scope of this invention to introduce additional feedstock, i.e., hydrocarbon material, to the second and subsequent zones. This would be particularly useful if light, non-refractory hydrocarbon materials are available which have little tendency to coke under the favorable conditions that prevail in the subsequent zones.

It is to be understood that while I have illustrated and described certain forms of my invention, it is not to be limited to the specific form or arrangement of parts herein described and shown.

What is claimed and desired to be secured by letters patent is:

1. A method for catalytically cracking hydrocarbons in a riser reactor comprising:
   a. introducing a hydrocarbon material and steam into a first zone of a riser reactor having a plurality of zones;
   b. introducing fresh catalyst into said reactor first zone adjacent the point of introduction of said hydrocarbon and steam;
   c. diverting at least a portion of the mixture of hydrocarbon, steam and catalyst from a downstream end of the reactor first zone into a separating means;
   d. separating said catalyst from the mixture of same with hydrocarbon and steam;
   e. reintroducing the hydrocarbon and steam into said reactor into an upstream end of a second zone;
   f. introducing fresh catalyst into said reactor adjacent the upstream end of the second zone to form a mixture of same with the hydrocarbon and steam from said separating means; and
   g. separating said catalyst from said mixture of catalyst, hydrocarbon and steam from a downstream end of the reactor second zone and conducting said steam and hydrocarbon to equipment for processing same.

2. The method as set forth in claim 1 including:
   a. collecting said separated catalyst from the first and second zones;
   b. conducting said separated catalyst to a regenerator; and
   c. regenerating said separated catalyst to make fresh catalyst.

3. The method as set forth in claim 2 including:
   a. returning at least a portion of said regenerated fresh catalyst to said reactor for mixing same with the mixture of hydrocarbon and steam, said regenerated fresh catalyst being at least a portion of the fresh catalyst introduced into said mixture of hydrocarbon and steam in the first and second zones of said reactor.

4. The method as set forth in claim 1 including:
   a. controlling the introduction of fresh catalyst into said reactor in response to the temperature therein.

5. A method for catalytically cracking hydrocarbons in a riser reactor comprising:
   a. introducing a hydrocarbon material and steam into an upstream end of a reactor having a plurality of reaction zones connected in series relation;
   b. introducing fresh catalyst into the upstream end of the reactor adjacent the point of introduction of the hydrocarbon and steam and into the upstream end of each of the remaining zones;
   c. diverting at least a portion of the mixture of hydrocarbon, steam and catalyst from a downstream end of each zone into a separating means;
   d. separating in the separating means said catalyst from the mixture of same with hydrocarbon and steam;
   e. introducing the separated hydrocarbon and steam from one zone and fresh catalyst into an upstream end of the next downstream zone of the reactor;
   g. separating catalyst from a mixture of same with hydrocarbon and steam from the last downstream zone and recovering the last mentioned catalyst and hydrocarbon;
   h. collecting the separated catalyst;
   i. conducting the collected catalyst to a regenerator;
   j. regenerating the collected catalyst to make fresh catalyst; and
   k. returning at least a portion of said regenerated fresh catalyst to said reactor and introducing the regenerated fresh catalyst as at least a portion of the fresh catalyst introduced into the mixture of hydrocarbon and steam in the zones.

6. The method as set forth in claim 5 including:
   a. controlling separately the temperature in each of said zones by controlling the rate of introduction of fresh catalyst into the respective zone.

7. The method as set forth in claim 6 including:
   a. maintaining a positive catalyst head in the separating means as measured by a pressure controller by controlling the rate of discharge of catalyst from the separating means.

* * * * *